(12) United States Patent
Fondeur et al.

(10) Patent No.: US 6,882,778 B2
(45) Date of Patent: Apr. 19, 2005

(54) CHROMATIC DISPERSION COMPENSATION IN WAVEGUIDE ARRAYS

(75) Inventors: Barthelemy Fondeur, Mountain View, CA (US); Anca Sala, Sunnyvale, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/412,856

(22) Filed: Apr. 14, 2003

(65) Prior Publication Data

US 2003/0194183 A1 Oct. 16, 2003

Related U.S. Application Data

(60) Provisional application No. 60/372,657, filed on Apr. 15, 2002.

(51) Int. Cl.[7] .................................................. G02B 6/34
(52) U.S. Cl. ........................................ 385/37; 359/498
(58) Field of Search ............................. 385/24, 28, 37; 359/498

(56) References Cited

U.S. PATENT DOCUMENTS

| | | | | |
|---|---|---|---|---|
| 5,341,444 A | | 8/1994 | Henry et al. .................. 385/11 |
| 6,195,482 B1 | * | 2/2001 | Dragone ....................... 385/28 |
| 6,301,046 B1 | * | 10/2001 | Tai et al. ..................... 359/498 |
| 6,304,687 B1 | | 10/2001 | Inoue et al. .................. 385/14 |
| 6,507,620 B1 | * | 1/2003 | Usui .......................... 375/257 |
| 6,728,442 B1 | * | 4/2004 | Missey et al. ................ 385/37 |
| 6,744,951 B1 | * | 6/2004 | Dawes et al. ................ 385/50 |
| 2002/0122623 A1 | * | 9/2002 | Yoneda ....................... 385/37 |
| 2003/0123878 A1 | * | 7/2003 | Li et al. ...................... 398/79 |

OTHER PUBLICATIONS

K. Okamoto, "Arrayed–waveguide grating multiplexer with flat spectral response", Optics Letters, vol. 20, No. 1, Jan. 1, 1995, pp. 43–45.

* cited by examiner

*Primary Examiner*—Frank G. Font
*Assistant Examiner*—Derek L. Dupuis
(74) *Attorney, Agent, or Firm*—Allen, Dyer, Doppelt, Milbrath & Gilchrist, P.A.

(57) ABSTRACT

A flat-top arrayed waveguide grating with a Hyper-Gaussian distribution function and a modified sinc design exhibits a very low chromatic dispersion, low loss and requires a relatively small number of waveguides. Controlled loss is introduced into certain waveguides of the array by creating gaps (unguided regions) between the waveguides to produce a desired predetermined amplitude distribution. The gaps are preferably arranged in the middle of the array.

9 Claims, 14 Drawing Sheets

CHROMATIC DISPERSION COMPENSATION IN WAVEGUIDE ARRAYS

RELATED APPLICATIONS:

This application claims priority from U.S. provisional application No. 60/372,657 filed Apr. 15, 2002.

TECHNICAL FIELD

This invention relates to optical communications, and more particularly to arrayed waveguide gratings, or waveguide grating routers, with reduced chromatic dispersion.

BACKGROUND ART

Increasing the transmission capacity in optical networks requires wide band, narrow spacing optical components such as arrayed waveguide gratings (AWGs), operating at high bit rates. This places a number of constraints on the optical characteristics of the devices, including low chromatic dispersion.

Chromatic dispersion of a material relates to the speed that energy at different wavelengths travels through a material. Controlling the dispersion of arrayed waveguide gratings will be essential in 40 Gigabit per second (Gbps) transmission systems and in spectrally efficient 10 Gbps systems (50 GHz spacing). Having the ability to design the dispersion characteristics in an AWG offers significant advantages.

AWGs typically include an input waveguide, a slab free-propagation region, an arrayed waveguide grating, a slab-focusing region and output waveguides. Conventional AWG designs have obtained a flattened AWG intensity passband by applying a mode structure (MMI, parabolic horn, etc . . . ) to the standard AWG design at the entrance of one slab and a standard taper on the other slab. Because the passband is the result of the convolution between the two modes, the spectrum gets flattened. However, this design method leads to high dispersion and dispersion slope in the passband due to the non-flat phase of the multi-mode structure.

A second approach (Okamoto and Yamada, Optics Letters, Vol. 20, No. 1, Jan. 1, 1995) modifies the arrayed waveguide gratings to generate a sinc-like distribution that leads to a dispersion-free flattened passband. This approach uses a standard input/output in the slabs but modifies the amplitude distribution by adding some loss on some waveguides (amplitude) and changing the length of some waveguides (phase).

A low loss, very wide and flat-top AWG is described by Dragone in U.S. Pat. No. 6,195,482 (2001). The AWG is based on amplitude and phase modifications of the arrayed waveguides to give the desired spectral characteristics, and MMI (Multi-Mode Interference) tapers at the input and/or output of the device for minimum penalty loss.

In the case of flat-top AWG's based on a parabolic horn design, as described in the Dragone '482 patent, the specification of which is being incorporated herewith by reference, the chromatic dispersion (CD) over the 3 dB passband suffers a penalty as compared to Gaussian devices. In addition, CD increases 4 times with each halving of the channel spacing, thus easily exceeding typical values in the case of flat-top AWG's with spacing 50 GHz and less. For such AWG's, the CD should be compensated or reduced.

Various approaches have been proposed to modify the optical path lengths of AWGs. These include grooves formed in the optical paths for thermal compensation, as proposed by Inoue et al, U.S. Pat. No. 6,304,687; a patch for compensating birefringence induced by compressive strain, as in U.S. Pat. No. 5,341,444 to Henry et al; or replacing part of the silica core of the AWG pathways with polymeric inserts, also for temperature compensation.

Chromatic dispersion is due to non-linear phase variation across the passband. It is possible to modify (compensate) the phase in some pathways, or each pathway of the waveguide array of an AWG. This approach results in a reduction of CD, but not its complete elimination.

SUMMARY OF THE INVENTION

The invention provides an arrayed waveguide grating or waveguide grating router with a flat-top spectral response and a minimal chromatic dispersion of the optical signals passing through the grating. The router has a first optical coupling device having at least one input port and P output ports, a second optical coupling device having at least P input ports and at least one output port; and P optical paths coupling the output ports of the first coupling device to the input ports of the second coupling device. At least some of the optical paths have physical gaps, or discontinuities, between the coupling devices to produce optical energy losses in selected optical paths. The placement and length of the gaps are selected to introduce controlled losses in selected optical paths and thus control the electrical field amplitude distribution over the optical paths of the router to produce a desired amplitude distribution profile resulting in a flat chromatic dispersion profile in the passband of the grating (router).

Preferably, the amplitude distribution in the optical paths of the router, or its spectral characteristics, corresponds to a Hyper-Gaussian (HG) function. Since the spectral response of an output port of the grating (AWG) is related to this amplitude distribution through a Fourier transform, an output spectral function with a flat top is obtained. However, with linear taper inputs to the first free-space coupling device (region) of the AWG, the amplitude distribution usually excited in the arrayed waveguides has a Gaussian functional shape instead of the desired hyper-Gaussian shape. The HG shape can be obtained by introducing losses in selected channels of the waveguide array. This approach however leads to a device which has a high insertion loss.

To overcome this problem, parabolic horn input and output ports to the planar free space coupling regions are used. This results in the functional shape of the excited amplitude distribution in the waveguide array approaching the HG shape. The final desired HG shape is achieved by introducing loss and phase changes in selected channel waveguides of the array. The loss is created by way of gaps in selected channels of the array.

In the gap, light propagates in an unguided planar waveguide region and thus expands laterally before it is recaptured in the corresponding channel waveguide. Such a gap creates losses that are controllable through the length of the gap separation, longer gaps corresponding to larger losses. Since the light radiated into the planar waveguide region from a given waveguide may be captured in the adjacent waveguides of the array, this can lead to crosstalk in the AWG output. The crosstalk can be kept under control by assuring a sufficiently large separation between channel waveguides in the array.

BRIEF DESCRIPTION OF THE DRAWINGS

The invention will be explained in more detail by way of the following detailed description in conjunction with the drawings, in which.

DETAILED DESCRIPTION OF THE EMBODIMENTS OF THE INVENTION

Figure 1C:
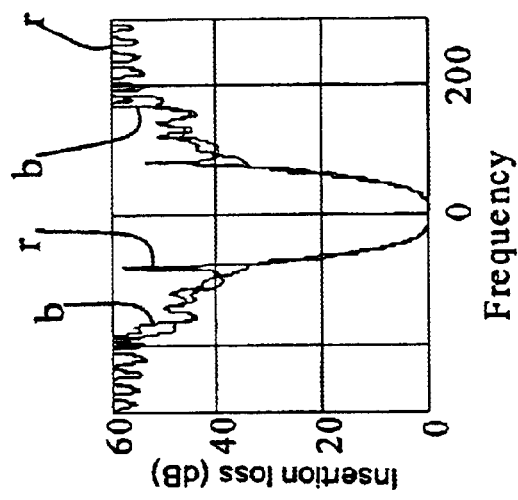
FIGS. 1a–1d are graphs showing the spectral characteristics (amplitude, phase, insertion loss and chromatic dispersion respectively) of a prior art 100 GHz flat-top AWG with phase compensation (r) and without phase compensation (b)
Figure 1D:
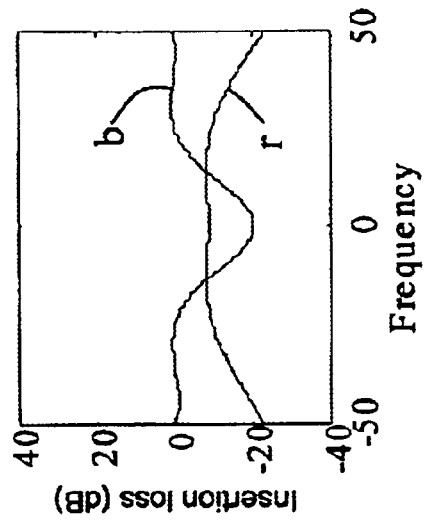
Figure 1A:
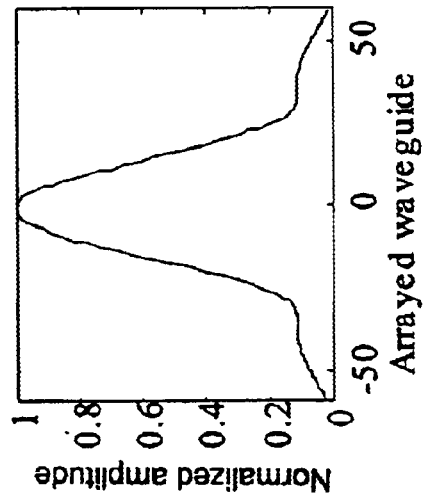
Figure 1B:
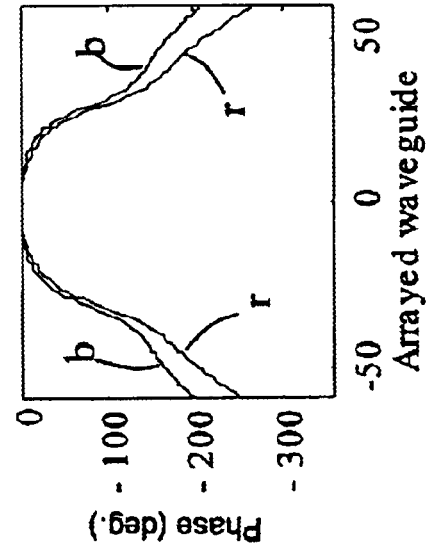
Figure 2A:
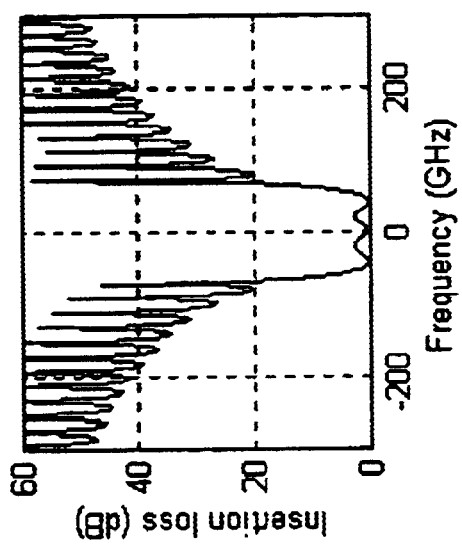
FIGS. 2a–2d are graphs showing the spectral characteristics (amplitude, phase, insertion loss and CD respectively) of a simulated 100 GHz sinc AWG with truncated amplitude distribution.
Figure 2B:
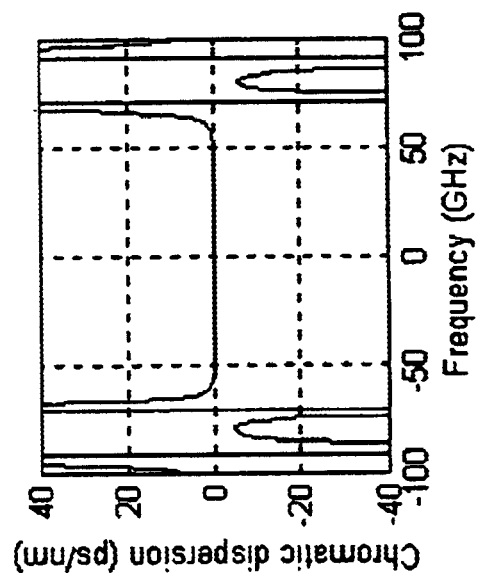
Figure 2C:
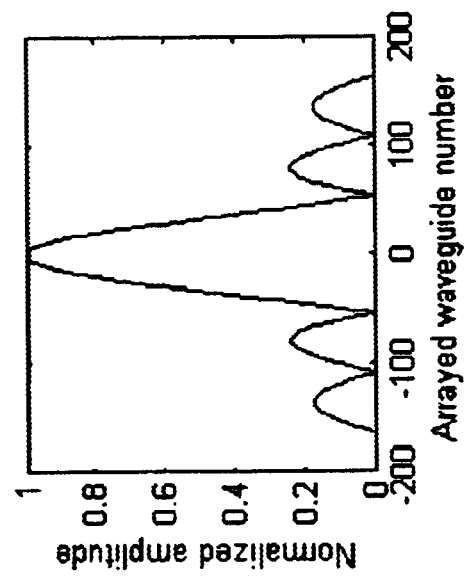
Figure 2D:
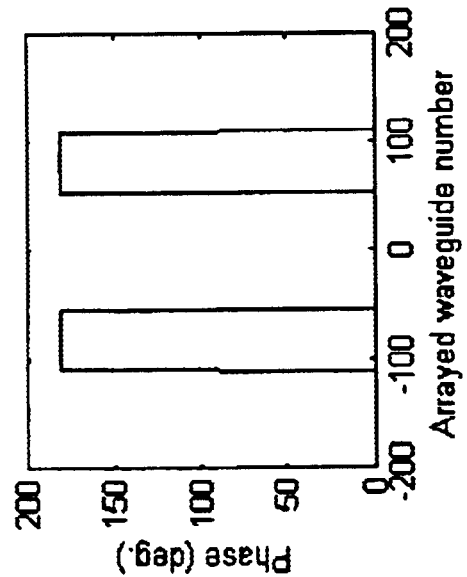
Figure 3A:
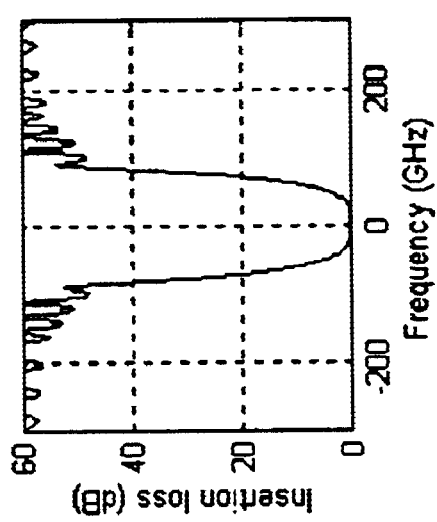
FIGS. 3a–3d are graphs showing the spectral characteristics (normalized amplitude, phase, IL and CD respectively) of a simulated 100 GHz AWG according to an embodiment of the invention.
Figure 3B:
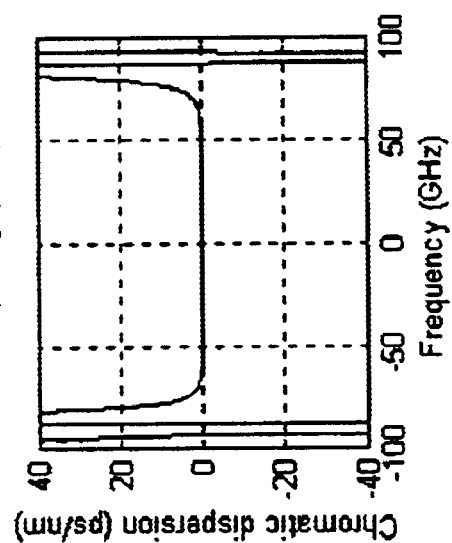
Figure 3C:
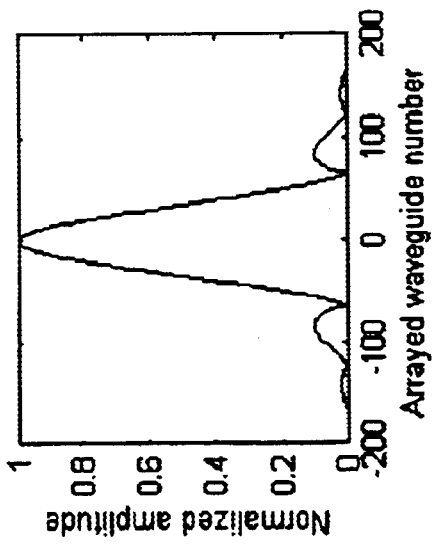
Figure 3D:
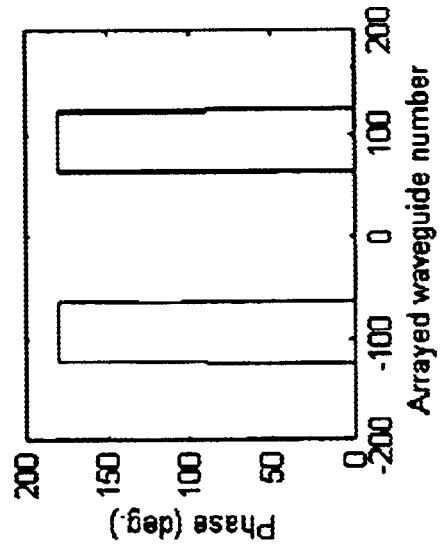
Figure 4A:
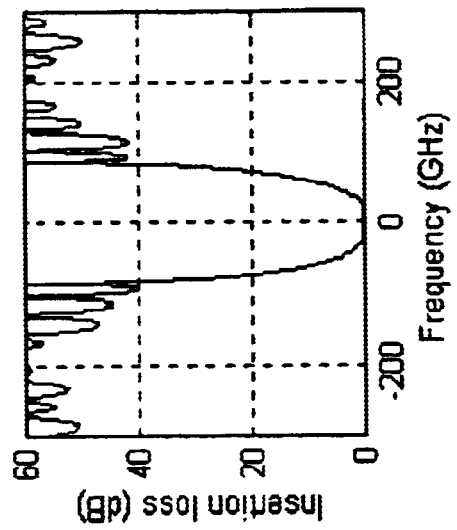
FIGS. 4a–4d are graphs showing the spectral characteristics as in FIGS. 3a–3d of a simulated 100 GHz AWG using linear tapers for input and output, where g denotes initial Gaussian amplitude distribution and b denotes the HG distribution.
Figure 4B:
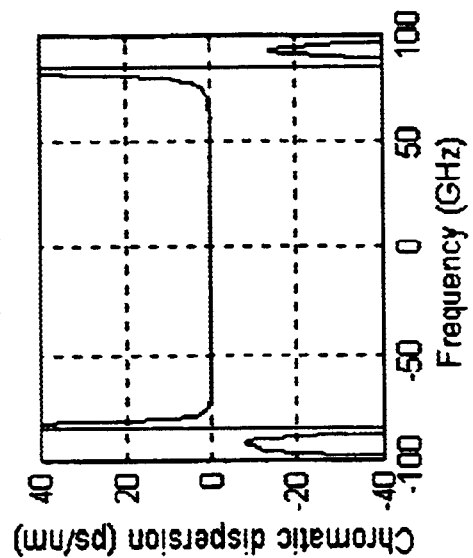
Figure 4C:
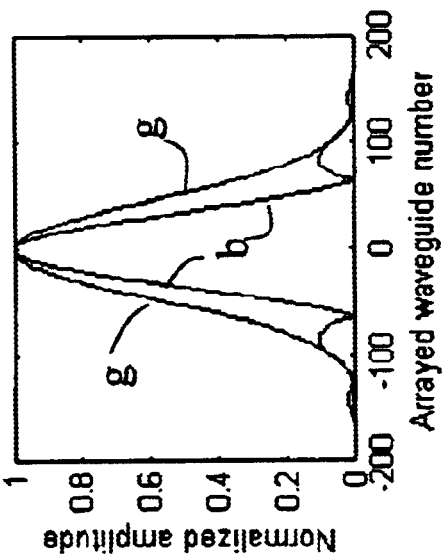
Figure 4D:
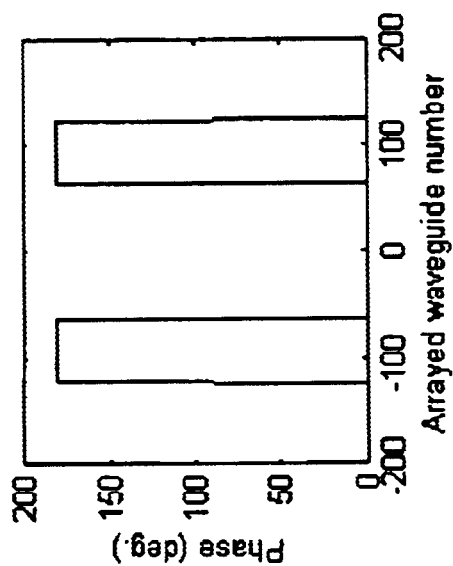

Most common design for flat-top AWG's is based on using a parabolic horn at the interface between the input waveguide and first slab region and a linear taper for the output waveguides. The overlap of the fields of the parabolic horn and the output taper leads to a flat transmission response with the expense of mismatch penalty loss and chromatic dispersion. The added CD is due to multi-mode propagation of light through the parabolic horn, which changes the phase response of the device.

As CD is due to nonlinear phase variation across the passband, to compensate it some phase can be added to each of the arrayed waveguides in order to linearize it. This approach is briefly reviewed below.

An AWG model was used to find the optimum phase modification for each combination of parabolic horn—output taper, to reduce and flatten the CD within the 3 dB passband of the device. The adjustment described here consists of a quadratic term added to the path delay in the $i^{th}$ array waveguide as shown in the formula (1):

$$L_i = L_0 + i*m*\lambda c + \left(i - \frac{N}{2}\right)^2 *\delta \quad (1)$$

where L is the length of the arrayed waveguide, $L_0$ the length of the first waveguide, in the grating order, N the number of arrayed waveguides, $\lambda c$ the central wavelength, and $\delta$ the coefficient of phase compensation.

A prior art design was tested and the results are illustrated in FIG. 1. The design corresponds to a flat-top, 1 00 GHz spacing AWG with parabolic horn with length=300 $\mu$m, and output tapers with width=15.5 $\mu$m and pitch=27 $\mu$m. This design gives a wide, flat-top AWG with 1 dB bandwidth= 0.40 nm. By adjusting the phases of the waveguides in the array, the chromatic dispersion can be flattened, with a minimum value of −10 ps/nm instead of the initial minimum of −20 ps/nm, over the 3 dB passband of the device.

It can be seen that in this prior art design, the phase compensation method cannot remove all the CD across the 3 dB passband of the device. For spacing narrower than 100 GHz, the CD after compensation might still be higher than the value required by certain applications. A different compensation design approach is necessary to further reduce the amount of CD.

Gaussian AWG devices are part of the class of Finite Impulse Response (FIR) filters characterized by linear phase, and as such they have zero chromatic dispersion over the passband. Flat-top AWG's that use a parabolic horn design at the input waveguide introduce chromatic dispersion due to phase response of the horn.

Flat-top AWGs can also be designed using a sinc approach (Okamoto and Yamada, Optics Letters 20, pp. 43–45, 1995). Rather than flattening the transmission with a parabolic horn at the input, the arrayed waveguide grating is given an amplitude and phase distribution resembling a sinc function (sin x/x), that will be imaged by the second slab as the Fourier transform of a sinc, i.e. a rectangular transmission. This design will result in a relatively large insertion loss penalty, as the amplitude distribution of the sinc function does not match well the Gaussian distribution in the arrayed waveguide region.

The present invention proposes a low loss, flat-top AWG with zero chromatic dispersion across the passband. Zero chromatic dispersion is obtained with constant phase across the region of the arrayed waveguides (with the exception of a number of n changes). Also, the CD in this case is virtually independent of channel spacing, which eliminates the scaling of CD to very large values for very narrow spacing AWG's that takes place in parabolic horn flat-top AWG's. The target spectral characteristics is a Hyper-Gaussian function, instead of a rectangular function as in the Okamoto paper, supra.

Due to the finite extent of the arrayed waveguide region, the sinc distribution will be truncated in practice to a small number of lobes on each side of the central main peak. When Fourier transformed by the second slab, the truncated pattern will result in Gibbs oscillations, with added lobes in the high loss regions of the signal peak and degradation of the adjacent channel crosstalk of the device. A sinc AWG affected by this phenomenon is shown in FIG. 2. As seen in the figure, a very wide band device with zero CD across the entire passband can be obtained by this design. One disadvantage is that it requires a very large number of waveguides in the array to avoid the truncation, making processing very difficult.

The undesirable side lobes that appear with the truncated sinc can be eliminated by targeting a Hyper-Gaussian function for the spectrum. As shown in FIG. 3, a flat-top AWG with no side lobes and very good crosstalk characteristics can be obtained with a finite number of side lobes in the array amplitude distribution, with a reduced number of arrayed waveguides required. The modification does not change the property of CD, which will remain zero across the entire passband.

The Hyper-Gaussian (HG) approach will now be described in more detail. The Hyper-Gaussian design can be achieved using linear tapers for the input and output waveguides, which have Gaussian fields, with modified arrayed waveguides whose amplitudes and phases will lead to the required distribution.

Figure 5:
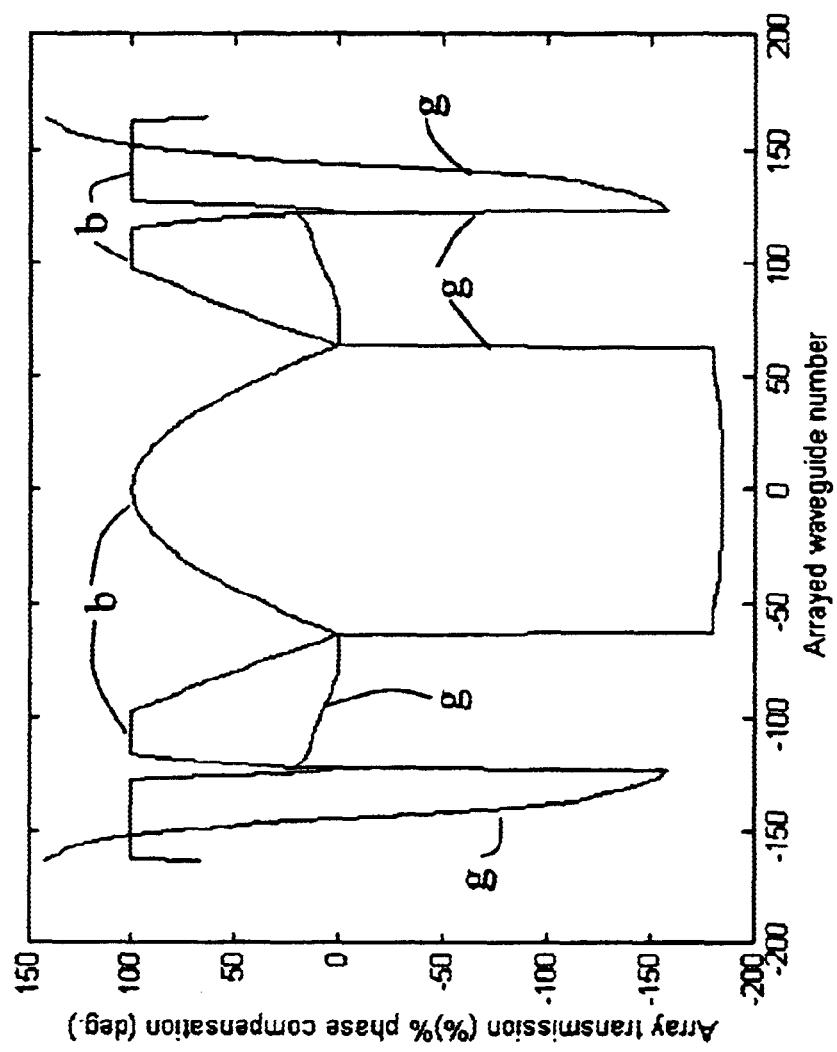
FIG. 5 illustrates a transfer function for a HG distribution of an arrayed waveguide grating of the invention, where b denotes array amplitude modifications and g denotes phase modifications required by the HG design.
Figure 6A:
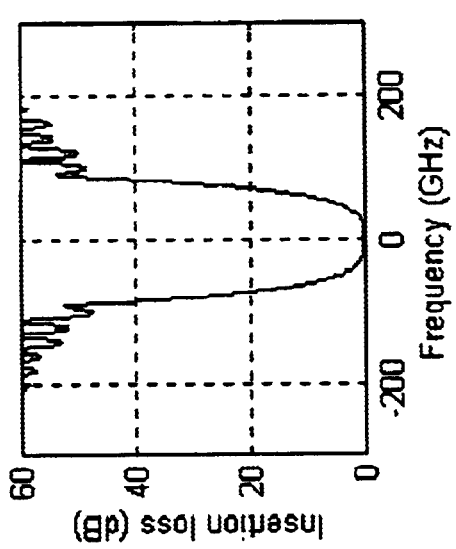
FIGS. 6a–6d are graphs showing the spectral characteristics as in FIGS. 3a–3d of a simulated 100 GHz Hyper-Gaussian AWG using parabolic horns for input and output, where g denotes initial parabolic horn amplitude distribution.
Figure 6C:
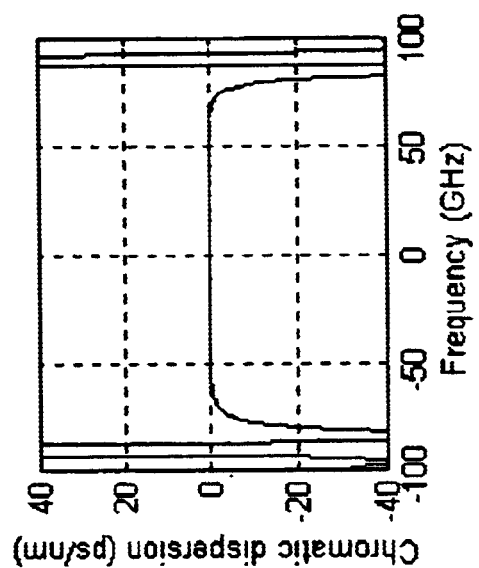
Figure 6B:
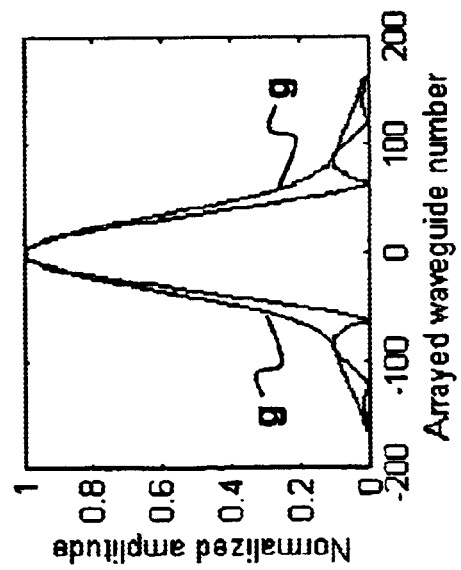
Figure 6D:
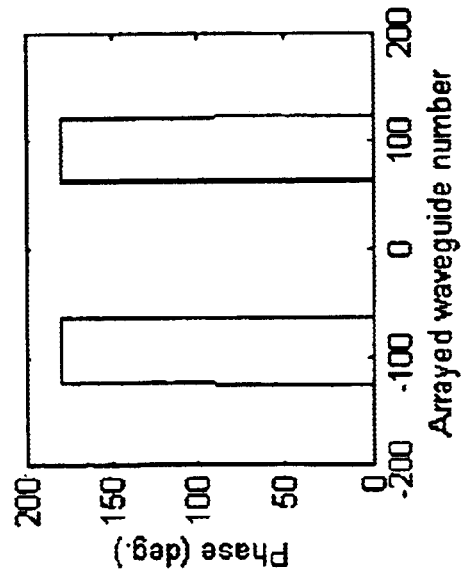

FIG. 4 shows the original amplitude array distribution of a Gaussian 100 GHz AWG together with the required amplitude distribution of the HG AWG and FIG. 5 shows the transfer function of the arrayed waveguide required for the HG distribution. As can be seen, a large amount of loss needs to be added to some waveguides. This results in some insertion loss penalty due to the mismatch between the amplitude distribution of the HG and the Gaussian distribution of the tapers. Simulations indicate that the insertion loss (IL) penalty of a HG AWG with Gaussian tapers is even higher than the IL penalty of a classical parabolic horn flat-top AWG with the same passband width and flatness. For example, for the case shown in FIG. 4, the IL with the HG design is about 2 dB higher than for a standard flat-top design (parabolic horn).

Parabolic Horn HG Design

In order to reduce the insertion loss penalty of the HG design, parabolic horns at input and output waveguides can be used instead of linear tapers, in combination with a HG type array amplitude distribution.

As can be seen when comparing FIG. 6 to FIG. 4, the amplitude distribution given by the parabolic horns is closer to the HG amplitude distribution than that given by linear tapers. This leads to a reduction of IL as less loss needs to be added to the arrayed-waveguides to get the HG distribution.

An optimum match between the two amplitude distributions has to be found to result in the minimum IL penalty. In the case of FIG. 6, parabolic horns with length of 150 $\mu$m are used on input and output waveguides, which gives an IL penalty comparable to the one given by standard flat-top designs, but with zero-dispersion.

The HG design can be realized as explained below.

For both HG designs mentioned, changes must be made to the arrayed waveguides to obtain the desired amplitude and phase distributions. In the case of amplitude, loss must be introduced in certain amounts on a number of arrayed waveguides, while in the case of phases, delays must be added to waveguides in the array to realize the desired phase profile.

The HG function can be written as $$T(\lambda - \lambda c) = \left(\frac{1}{2}\right)^{\left(\frac{\lambda-\lambda c}{\frac{BW}{2}}\right)^{2n}} \quad (2)$$

where n≧1, BW is directly the 3 dB bandwidth, and $\lambda_c$ is central wavelength.

As shown in the prior art, loss in the arrayed waveguides can be produced through offsets. In the present invention, the design is based on gaps whose lengths are varied to produce the right amount of loss. The following equation can be used to calculate the gap as a function of the desired loss.

$$Gap = \frac{2n_{clad}\pi w_0^2}{\lambda c}\sqrt{\frac{1-T}{T}} \quad (3)$$

where $n_{clad}$ is the index of the embedding glass, $w_0$ is the waist radius, $\lambda c$ is the central wavelength, and T the required transmission.

Besides loss, the gaps will also introduce small phase differences from the no-gap case, due to different refractive index inside gaps. These phase differences must be taken into account when making the phase changes in the array to achieve the desired HG phase profile.

Figure 7:
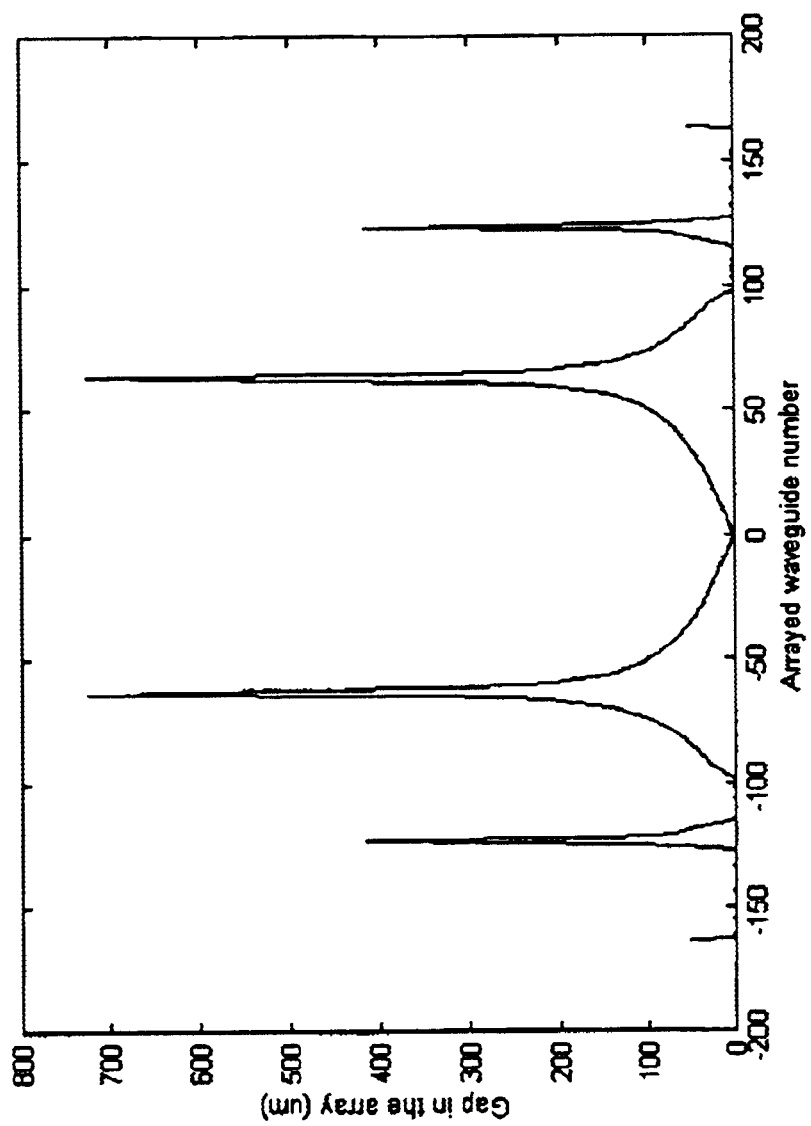
FIG. 7 is a representation of exemplary gap variation across arrayed waveguides required to achieve a desired H-G amplitude distribution for an AWG of the invention.

FIG. 7 shows an example of the gap variation needed in the array to achieve the correct amplitude distribution leading to the desired HG profile.

Figure 8:
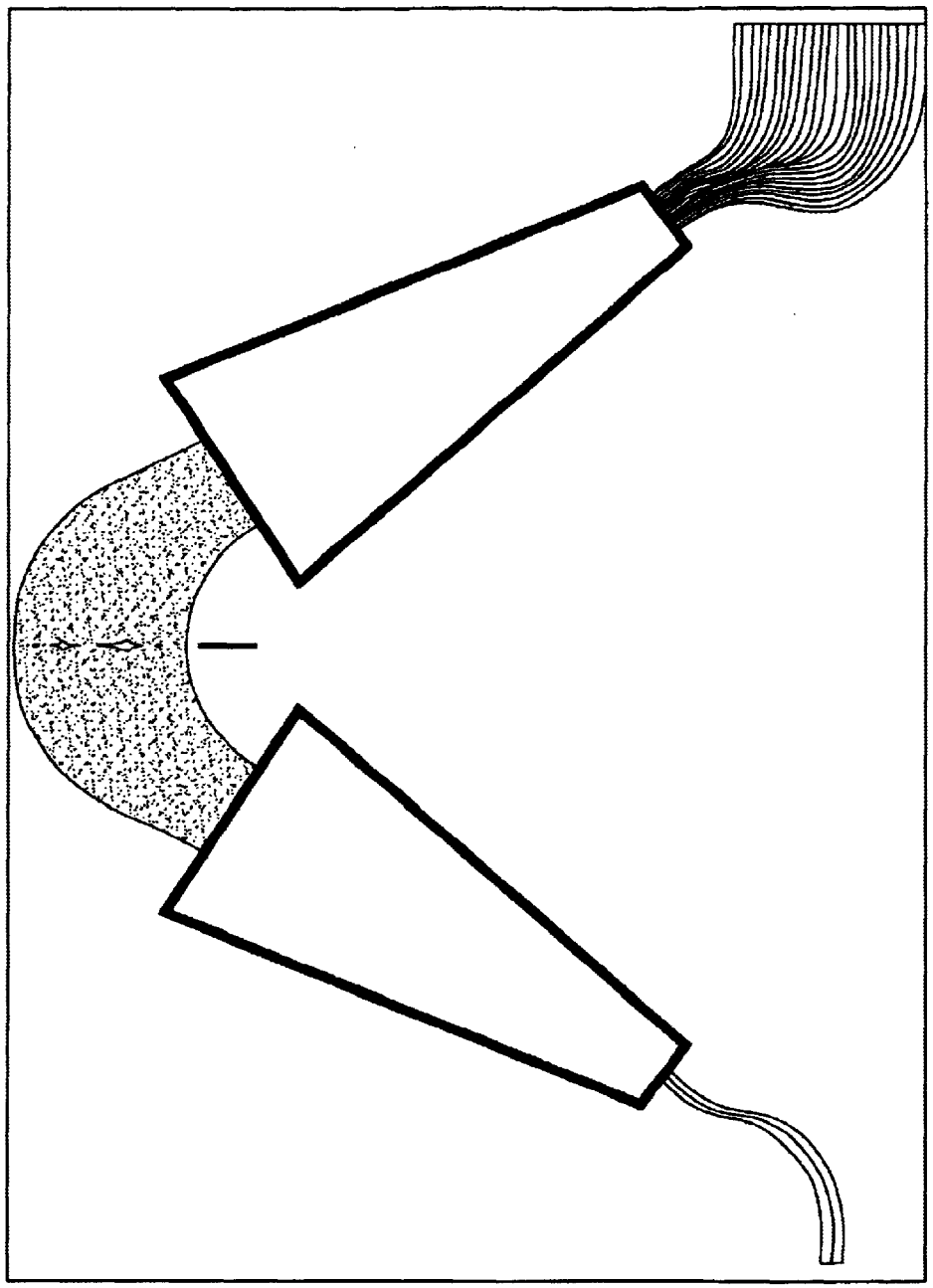
FIG. 8 is a top view of a chip with an AWG of the invention.
Figure 9:
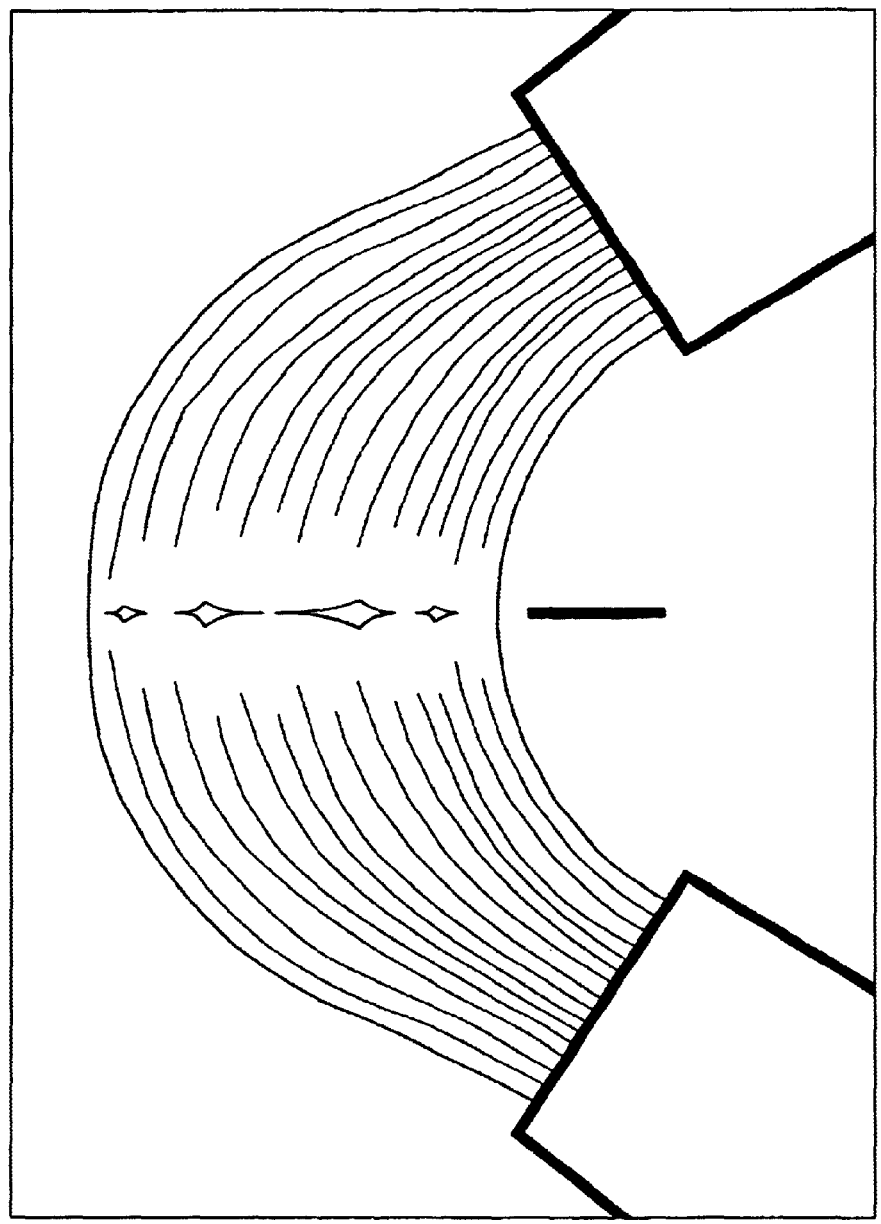
FIG. 9 is an enlarged partial view of the AWG of FIG. 8.
Figure 10:
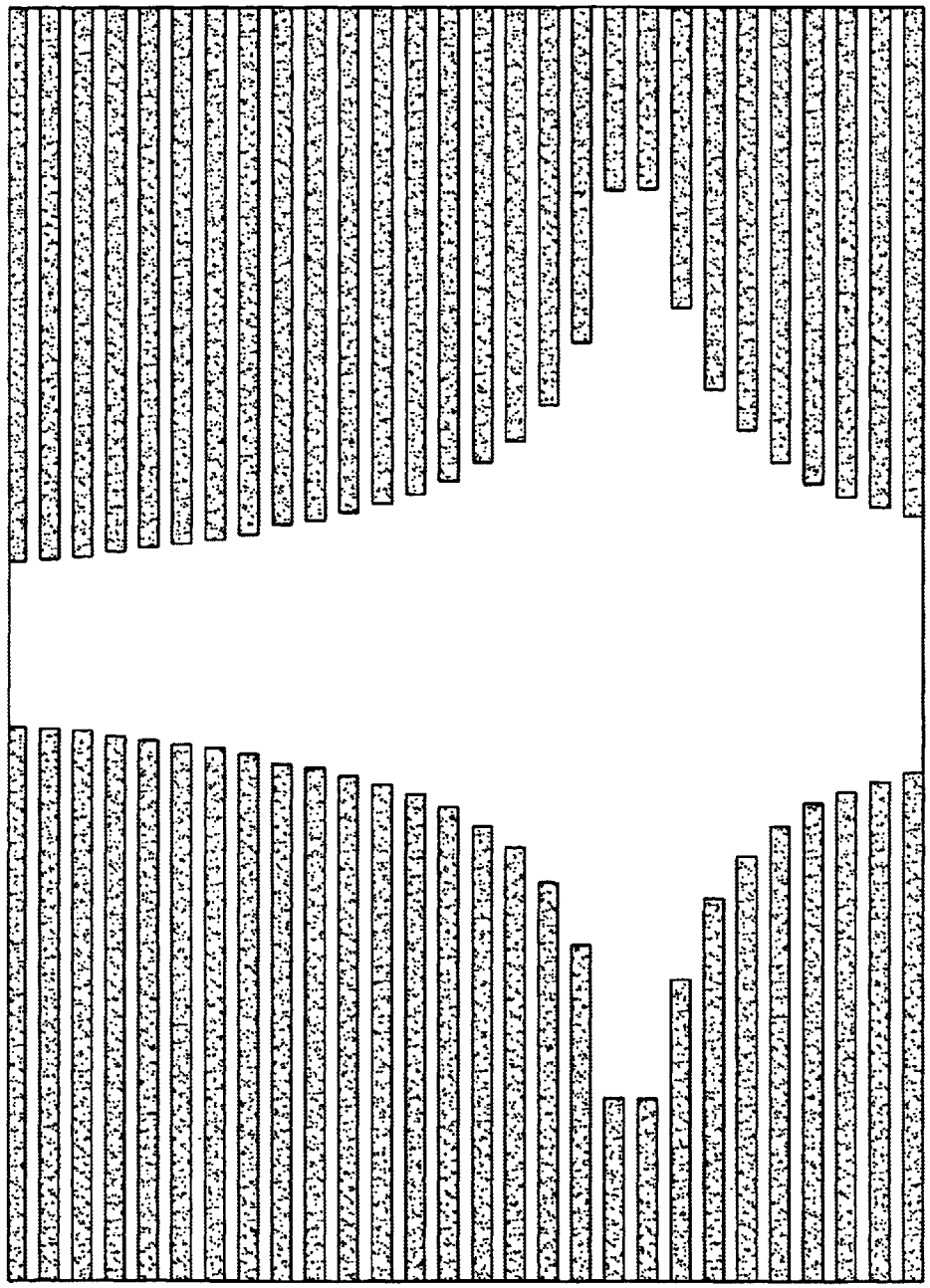
FIG. 10 is an enlarged view of the central portion of the AWG of FIG. 9 showing the gaps disposed symmetrically in the waveguide array.
Figure 11A:
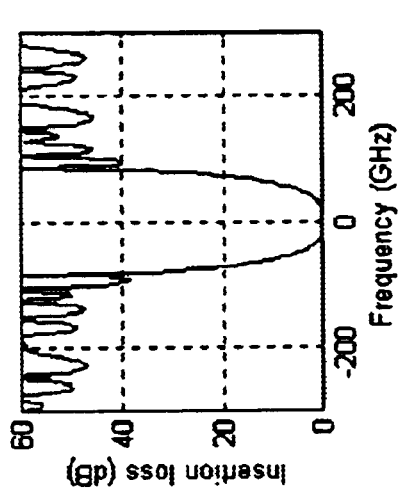
FIGS. 11a–11d are graphs showing the spectral characteristics of an AWG with gaps of the invention, with minimum distance between arrayed waveguides 10 $\mu$m.
Figure 11C:
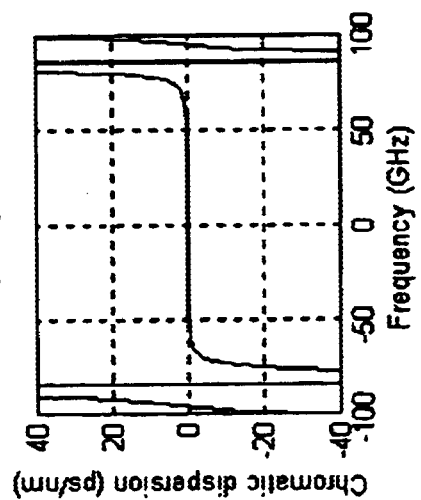
Figure 11B:
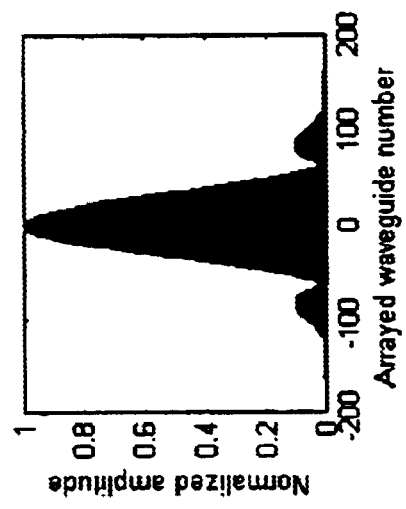
Figure 11D:
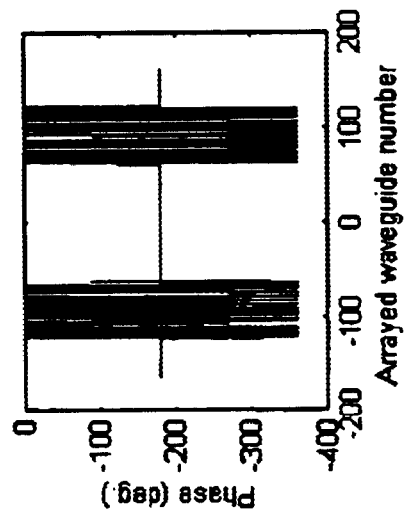
Figure 12A:
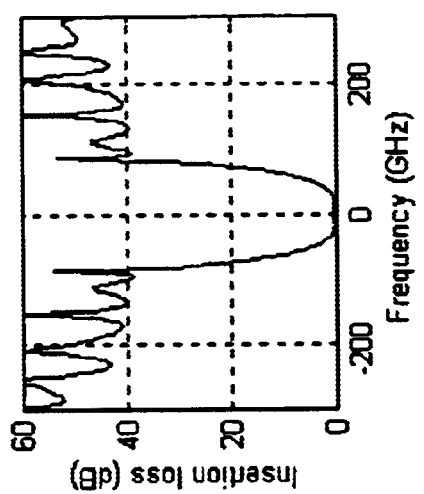
FIGS. 12a–12d are graphs showing the spectral characteristics as in FIGS. 11a–11d but with 15 $\mu$m distance between the arrayed waveguides.
Figure 12B:
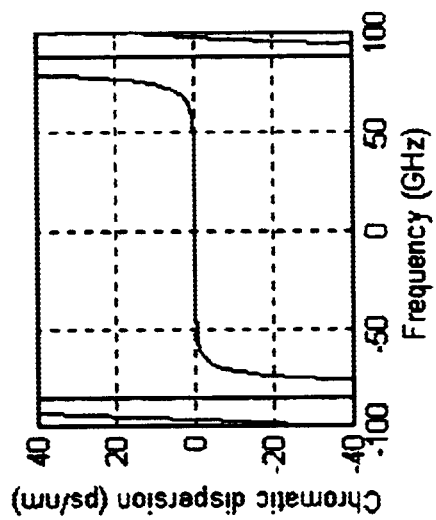
Figure 12C:
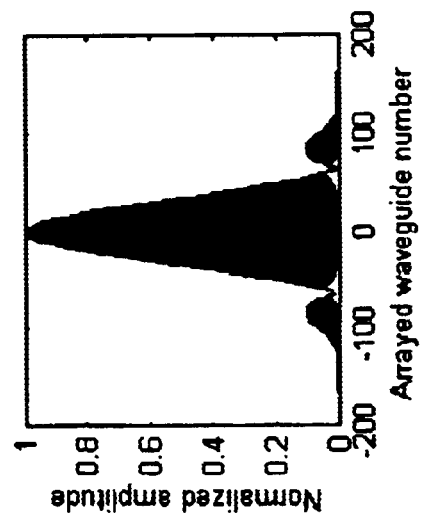
Figure 12D:
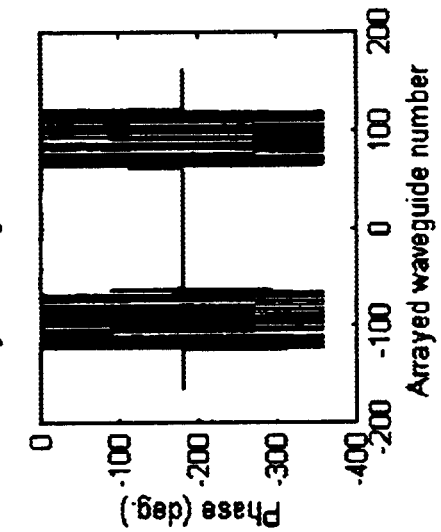
Figure 13C:
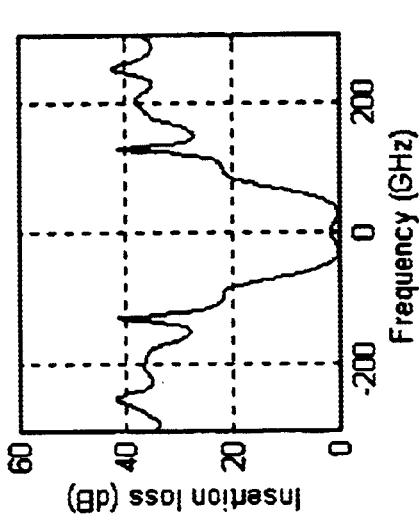
FIGS. 13a–13d are graphs showing the spectral characteristics as in FIGS. 11a–11d, with 5 $\mu$m distance between arrayed waveguides.
Figure 13D:
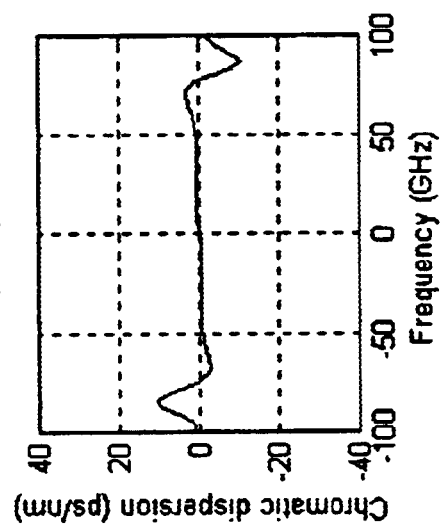
Figure 13A:
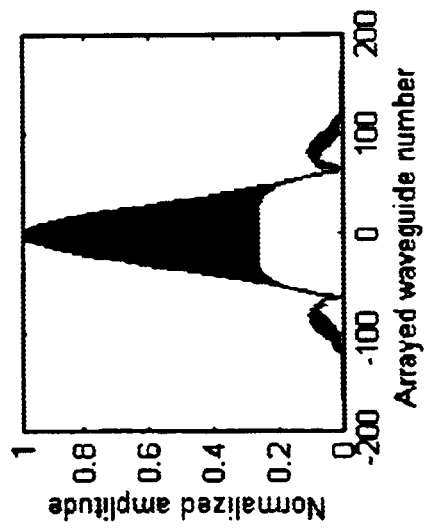
Figure 13B:
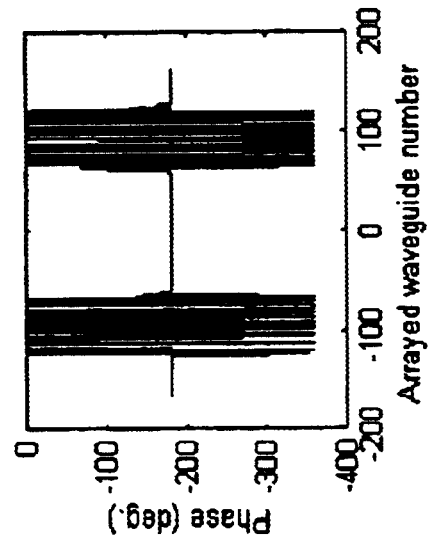

FIG. 8 shows the AWG chip with the array changes, with close-ups of the array region in FIGS. 9 and 10.

In the embodiment illustrated in FIGS. 9 and 10, the gaps are introduced in the center of the array and divide the array into two symmetrical parts.

The gaps are designed in the course of preparation of the respective lithography masks, in a manner known in the art. When the core layer is etched, the gaps will be created in the actual grating. The material of the chip and the dimensions, unless explained herein, are known to those versed in the art.

When introducing loss in the array through gaps in the arrayed waveguides, special care must be taken in order not to generate crosstalk due to unwanted coupling of light between neighboring waveguides. As can be seen in FIG. 10, light propagating through the gap can be coupled to adjacent arrayed waveguides, and add a term to the array distribution with a path difference increased by $\Delta L/2$. This coupling results into an interleaved array shifted by $\Delta L/2$, which can produce significant "ghost" peaks in the spectral transmission of the AWG.

In order to avoid such coupling in the array, a minimum distance between the waveguides must be found. FIGS. 11, 12, and 13 show the effect of coupling on the optical transmission. From these simulations, we determined that a distance of minimum 15 $\mu$m (FIG. 12) between the arrayed waveguides is safe in avoiding a meaningful crosstalk degradation. With the distance 10 $\mu$m (FIG. 11), significant coupling to adjacent waveguides is observed, and for 5 $\mu$m separation (FIG. 13), substantial degradation of the passband shape is apparent.

The low-CD AWG of the invention can be employed as an interleaver/de-interleaver, with numerous advantages including those discussed above. In further description, the term "interleaver" will be used to denote both functions, interleaving and de-interleaving.

Figure 14:
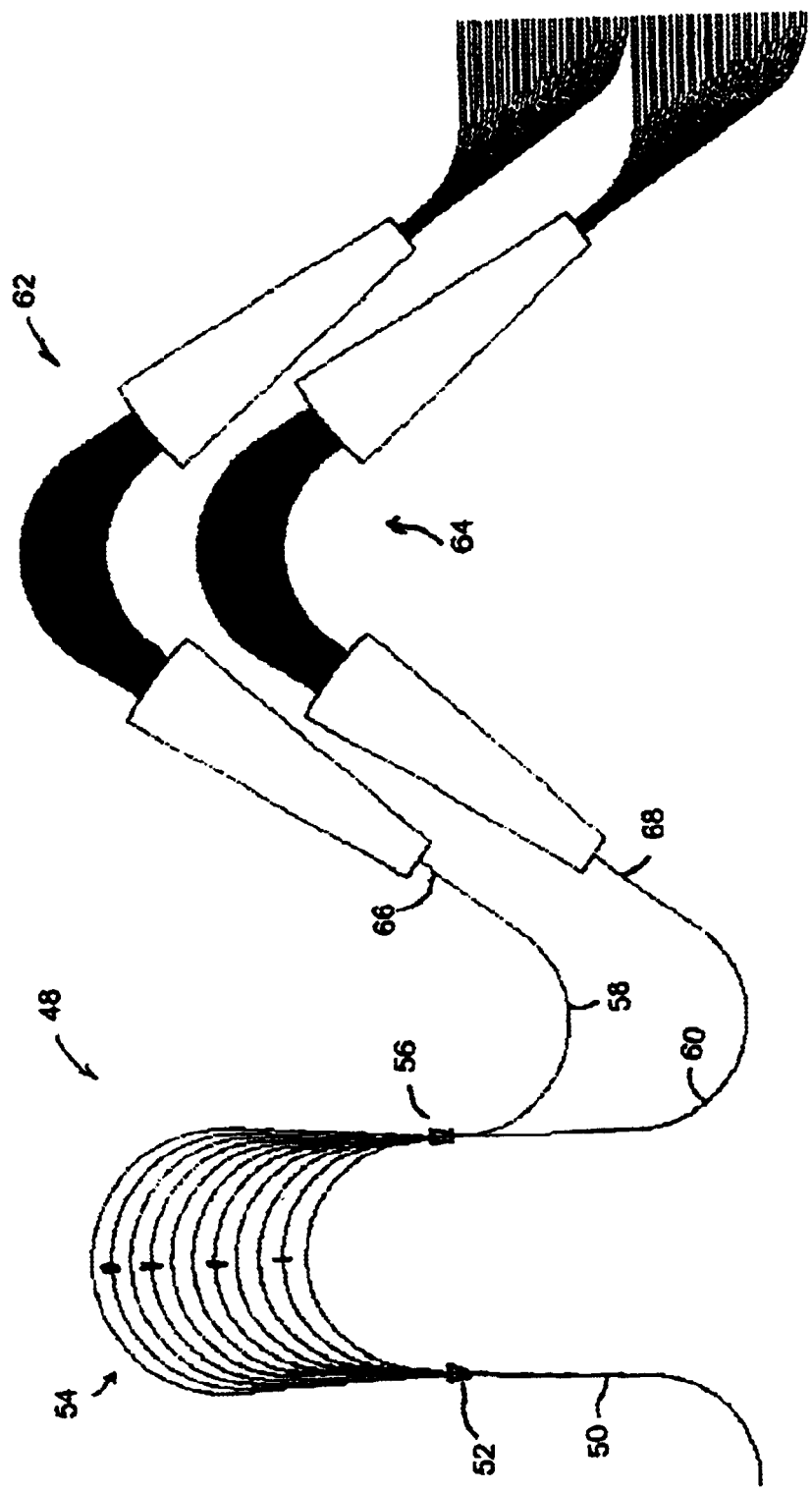
FIG. 14 is a schematic top view of an interleaver based on the arrayed waveguide grating of the invention.

As illustrated in FIG. 14, the interleaver 48 has an input waveguide 50, a first slab free-propagation region 52, a waveguide array 54, a second slab free-propagation region 56 and two output waveguides 58, 60. Each of the output waveguides is coupled to a standard WDM represented by a conventional AWG 62, 64 having each an input waveguide 66, 68 coupled to the respective output waveguide 58, 60 of the interleaver 48. The signal received by each AWG 62, 64, is demultiplexed into a plurality of channels, each corresponding to a central wavelength.

The free spectral range (FSR) of the interleaver 48 is a multiple, e.g. twice, of the spacing of the channels input to the interleaver through input waveguide 50. For example, the FSR of the interleaver may be 100 GHz which means that the signal transmitted through one of the output waveguides 58 contains a stream of "odd" wavelengths $\lambda_1$, $\lambda_3$, $\lambda_5$ ... separated by 100 GHz, while the other waveguide 60 transmits a stream of "even" wavelengths $\lambda_2$, $\lambda_4$, $\lambda_6$, $\lambda_8$ ... also separated by 100 GHz. Each stream is subsequently demultiplexed in the respective AWG 62, 64.

Of course, the multiple may be more than two and the number of the output waveguides of the interleaver, as well as the number of demultiplexers (AWG or other) may differ accordingly.

The waveguide array 54 of the interleaver 48 has a number of gaps in the middle (indicated schematically with dashed line) as described in detail hereinabove, for the above-discussed purposes. This provision, in combination with other properties of the interleaver as discussed with connection to FIGS. 3–13, produces a low dispersion, flat-top interleaver.

As mentioned above, the arrangement of FIG. 14 can work as an interleaver when the single-wavelength channels are supplied through the AWGs 62, 64 into the interleaver to be multiplexed and output through the waveguide 50 now serving as an output waveguide.

SUMMARY

A new AWG design, based on a HG approach, has been proposed and analyzed. This design can produce flat-top AWG's with the same bandwidth and insertion loss as parabolic horn AWG's, but with virtually zero CD across the passband, independent of the channel spacing.

It is a feature of the invention that the grating has a target spectral characteristic based on a Hyper-Gaussian (HG) function, removing oscillations and side lobes due to same effect as Gibbs phenomena in Signal Filtering. Compared to a classical sinc design, the design of the invention requires a smaller number of arrayed-waveguides. Further, optimized combination of parabolic horn at the input and parabolic horn or linear taper at the output is provided to achieve minimum penalty insertion loss.

It will be appreciated by those skilled in the art that the Hyper-Gaussian function is but one family of mathematical functions which have a narrow spectrum requiring a small number of arrayed waveguides. The same design could be implemented to other function families with similar properties.

What is claimed is:

1. A waveguide grating router comprising
   a first optical coupling device having at least one input port and P output ports, a second optical coupling device having at least P input ports arid at least one output port; and P optical paths coupling the output ports of the first coupling device to the input ports of the second coupling device, wherein at least some of the optical paths have gaps formed by unguided free-distribution regions disposed between the coupling devices to produce predetermined optical energy losses in selected optical paths and consequently a predetermined Hyper-Gaussian (HG) amplitude distribution profile through the optical paths, the profile selected to result in a flat substantially zero chromatic dispersion profile of the router, and wherein a shape of the first optical coupling device, a shape of the second optical coupling device, a length of each of the a optical paths and a dimension of each of the gaps are determined by the Hyper-Gaussian amplitude distribution profile.

2. The router of claim 1 wherein surrounding the gaps, adjacent optical paths are spaced from each other by a distance minimizing crosstalk caused by gaps.

3. The router of claim 2 wherein a spacing between adjacent optical paths is minimum 15 $\mu$m.

4. The router of claim 1 wherein the first coupling device includes a parabolic horn shape which contributes to the Hyper-Gaussian shape of the amplitude distribution.

5. The router of claim 4 wherein the second coupling device includes a parabolic horn shape.

6. The router of claim 4 wherein the second coupling device includes a linear taper shape.

7. The router of claim 4 wherein the optical paths have a symmetry about a centerline, and wherein the gaps are formed at the centerline of the optical paths.

8. The router of claim 1 wherein a length of each of the optical paths and a dimension of each of the gaps is determined in order to linearize phase variation across a passband to eliminate chromatic dispersion.

9. An optical interleaver comprising a waveguide grating router comprising a first optical coupling device having at least one input port and P output ports, a second optical coupling device having at least P input ports and at least one output port; and P optical paths coupling the output ports of the first coupling device to the input ports of the second coupling device, wherein at least some of the optical paths have gaps formed by unguided free-distribution regions disposed between the coupling devices to produce predetermined optical energy losses in selected optical paths and consequently a predetermined amplitude distribution profile through the optical paths, the profile comprising a Hyper-Gaussian amplitude distribution profile selected to result in a flat substantially zero chromatic dispersion profile of the router, wherein a shape of the first optical coupling device, a shape of the second optical coupling device, a length of each of the optical paths and a dimension of each of the gaps are determined by the Hyper-Gaussian amplitude distribution profile, and wherein free spectral range (FSR) of the router is a multiple of channel spacing input to the router.

* * * * *

UNITED STATES PATENT AND TRADEMARK OFFICE
CERTIFICATE OF CORRECTION

PATENT NO. : 6,882,778 B2
DATED : April 19, 2005
INVENTOR(S) : Fondeur et al.

It is certified that error appears in the above-identified patent and that said Letters Patent is hereby corrected as shown below:

Column 7,
Line 52, "pots arid at least" should read -- ports and at least --.

Signed and Sealed this

Thirteenth Day of December, 2005

JON W. DUDAS
*Director of the United States Patent and Trademark Office*